United States Patent [19]

Ma

[11] Patent Number: 4,805,232
[45] Date of Patent: Feb. 14, 1989

[54] FERRITE-CORE ANTENNA

[76] Inventor: John Y. Ma, 499 Dundee Ave., Milpitas, Calif. 90535

[21] Appl. No.: 3,588

[22] Filed: Jan. 15, 1987

[51] Int. Cl.⁴ .......................... H04B 1/18; H01Q 21/00
[52] U.S. Cl. .................................. 455/291; 455/280; 343/788; 343/867
[58] Field of Search ................. 455/291, 280, 287; 343/787, 788, 867, 702

[56] References Cited

U.S. PATENT DOCUMENTS

| | | | |
|---|---|---|---|
| 3,573,628 | 4/1971 | Cramer, Jr. et al. | 325/361 |
| 3,665,476 | 5/1972 | Taylor | 343/788 |
| 3,736,591 | 5/1973 | Rennels et al. | 343/702 |
| 4,103,241 | 7/1978 | Najork | 325/373 |
| 4,270,128 | 5/1981 | Drewett | 343/702 |
| 4,314,378 | 2/1982 | Fowler et al. | 455/291 |
| 4,407,000 | 9/1983 | Sasaki et al. | 343/788 |
| 4,458,248 | 7/1984 | Lyasko | 343/788 |

OTHER PUBLICATIONS

Henry Jasik, *Antenna Engineering Handbook*, 1st ed. McGraw Hill, New York, 1961, pp. 28-8 to 28-11.
R. C. Johnson & H. Jasik *Antenna Engineering Handbook*, 2nd ed., McGraw-Hill, New York, 1984, pp. 5-4 to 5-9 and 6-9 to 6-14.

*Primary Examiner*—Robert L. Griffin
*Assistant Examiner*—Ralph E. Smith
*Attorney, Agent, or Firm*—Stephen G. Rudisill

[57] ABSTRACT

A ferrite core antenna for use in the VHF and UHF range has a first coil on the core which is connected to a capacitance selected to resonate with the inductance of the coil at the desired frequency of operation. The ferrite core antenna also has a second coil for providing a signal to the input stage of a radio receiver. In contrast to conventional loopstick antennas for low frequencies, the operation of the ferrite core antenna in the VHF to UHF range is remarkably improved by using an input stage having a relatively high input impedance and using a greater number of turns in the second coil than the first which is tuned instead of the second. Preferably the first coil is centrally disposed and has a single turn in the form of a relatively wide band of conductive metal foil, and the second coil is offset by a certain distance from the first coil and feeds an input signal to the gate of a gallium arsenide field-effect transistor. For operation in the FM broadcast band, the ferrite core preferably has dimensions of 7 cm × 1 cm × 1.5 cm, and the second coil has about three turns. So that the first coil has a sufficiently high Q, the capacitance for resonating the first coil is provided by a number of capacitors connected in parallel.

20 Claims, 1 Drawing Sheet

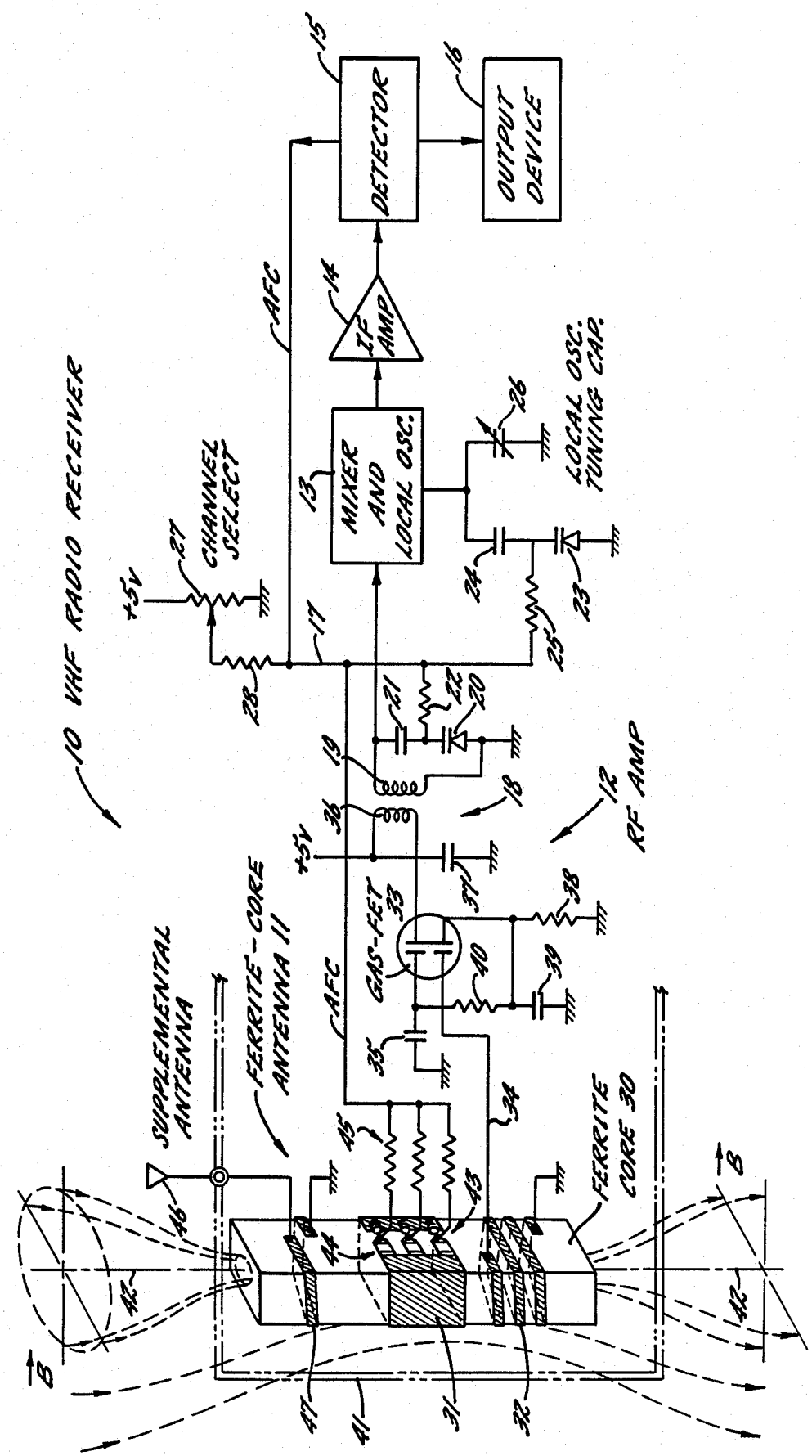

FERRITE-CORE ANTENNA

BACKGROUND OF THE INVENTION

1. Field of the Invention

The present invention generally relates to the field of antennas that have physical dimensions that are small compared to the wavelength of the electromagnetic radiation of interest. Such antennas are known as "small" antennas. The present invention more particularly relates to a small ferrite-core antenna for a radio receiver operating in the VHF to UHF range.

2. Background Art

When an electrically small loop of conductive material is used as a receiving antenna, the open-circuit voltage developed at the terminals of the loop is proportional to the component of the incident magnetic flux density normal to the plane of the loop. It is known that this open-circuit voltage can be increased by filling the loop with a core of magnetically permeable material, such as a ferrite. The effect of the core is to increase the magnetic flux through the area of the loop.

For small radio receivers operating in the AM broadcast band (at about 1 MHz) the ferrite rod inductor is the antenna most commonly used. An elongated ferrite rod in a thin helical coil greatly increases the effective area of the coil which intercepts the electromagnetic radiation. In this case, the "capture area" is determined primarily by the length of the ferrite rod rather than the diameter of the coil.

The number of turns in the coil is typically selected to set the impedance level at the terminals of the coil. In order to tune the antenna, a variable capacitor is typically connected in parallel across the terminals of the coil. Then the antenna resonates at the frequency at which the magnitude of the inductive reactance of the coil equals the magnitude of the capacitive reactance of the variable capacitor. The selection of the electrical parameters of the ferrite rod inductor antenna are further described in R. C. Johnson and Henry Jasik, *Antenna Engineering Handbook*, 2nd ed., McGraw-Hill Book Co., New York (1984) pp. 5-6 to 5-9.

SUMMARY OF THE INVENTION

The primary object of the invention is to provide a small antenna of increased sensitivity for operation in the VHF to UHF range.

Another object of the invention is to provide a highly sensitive radio receiver operating in the FM broadcast band with a compact internal antenna. Related objects are to provide such a radio receiver with electronic tuning and a connection for a supplemental external antenna.

BRIEF DESCRIPTION OF THE DRAWINGS

These and other advantages of the invention will be readily apparent upon reading the following detailed description and the accompanying drawings, in which:

The single figure is a schematic diagram of a preferred embodiment of a ferrite-core antenna and radio receiver according to the present invention.

While the invention will be described in connection with a certain preferred embodiment, it will be understood that it is not intended to limit the invention to the particular embodiment shown. On the contrary, the intention is to cover all alternatives, modifications, and equivalents as may be included within the spirit and scope of the invention as defined by the appended claims.

DETAILED DESCRIPTION OF THE PREFERRED EMBODIMENT

Turning now to the drawings, there is shown in the single figure a schematic diagram of a VHF radio receiver generally designated 10 incorporating a ferrite-core antenna 11 in accordance with the present invention. The radio receiver 10 is in the form of a conventional single conversion superheterodyne receiver including a radio frequency amplifier 12, a mixer and local oscillator 13, an intermediate frequency amplifier 14, and a detector 15. The detector 15 generates an output signal which is fed to an output device 16. For use in the standard FM broadcast band at around 100 MHz, the intermediate frequency amplifier 14 conventionally operates at 10.7 MHz. The detector 15 is a limiter-discriminator, or alternatively a ratio detector or phase-locked loop. The detector may generate an automatic frequency control signal which is fed back to the mixer and local oscillator by a line 17. The output device 16 is typically an audio frequency amplifier, although it may also include a stereo decoder, an SCA detector, or, in the case of an SCA pager, an SCA detector in combination with a microcomputer for additional digital decoding and display of the paging information.

As is conventional in a superheterodyne receiver, both the radio frequency amplifier 12 and the local oscillator 13 have tuned circuits which are adjusted in synchronism to select a desired frequency. The radio frequency amplifier 12 operates at the frequency of the desired signal, and the local oscillator is tuned so that the difference between the frequency of the local oscillator and the desired frequency is equal to the intermediate frequency of the intermediate frequency amplifier 14. In the prior art, this tuning function has been performed using ganged or mechanically linked variable capacitors or variable inductors, or commonly biased varactor diodes.

For tuning the radio frequency amplifier 12, an interstage transformer 18 is provided having a tuned secondary coil 19 shunted by a tuning capacitance comprised of a varactor diode 20 in series with a DC blocking capacitor 21. The varactor diode 20 is, for example, part No. BB221, and the capacitor 21 has a value of 1,000 pF. To bias the varactor diode 20 with the automatic frequency control signal, a resistor 22 connects line 17 to the varactor 20. The resistor 22 has a value, for example, of 100K ohms. To tune the local oscillator of the mixer 13, the local oscillator is connected to a second varactor 23, a second DC blocking capacitor 24, and a second resistor 25. The varactor 23 is, for example, part No. BB221, and the resistor has a value of 100K ohms. To obtain proper tracking of the local oscillator frequency with the tuning of the radio frequency amplifier, the second DC blocking capacitor 24 has a smaller capacitance than that of the first DC blocking capacitor 21. The second DC blocking capacitor 24 has a value, for example, of 33 picofarads. The frequency of the local oscillator 13 is offset by the required intermediate frequency of 10.7 MHz by using a trimming capacitor 26 in parallel with the series connection of the varactor 23 and blocking capacitor 24. The trimming capacitor 26 has a value, for example, of 5 picofarads. In order to select a desired FM channel, the automatic frequency control line 17 is connected to a potentiometer 27 via a series resistor 28. The potentiometer 27 has a value, for example, of 47K ohms, and the resistor 28 has a value, for example, of 100K ohms.

The present invention concerns the use of a ferrite-core antenna 11 in the radio receiver 10. Although ferrite-core antennas have been used in AM broadcast band receivers operating at frequencies on the order of 1 MHz, ferrite-core antennas have not been generally used for FM broadcast band receivers. The inventor, however, was confronted with the long-felt need for a compact, unobtrusive antenna for a pager receiver for receiving paging signals in the FM broadcast band. A number of alternatives were considered, including the ferrite rod inductor. In accordance with the prior art, a coil was wound on a ferrite rod, and the number of turns was selected to match the input impedance of the radio frequency amplifier 12. The ferrite rod inductor was also tuned to the desired frequency by shunting the coil with a tuning capacitor of appropriate capacitance. This arrangement gave satisfactory operation comparable to other compact antennas considered for use in the pager receiver.

In accordance with the present invention, the sensivitity of the radio receiver using the ferrite-core antenna 11 was remarkably improved by at least 20 dB by using the particular form of ferrite-core antenna shown in the drawing. Although the reason for the improvement is not entirely clear, it appears that this improvement is due to the fact that the ferrite-core antenna 11 comprises a ferrite-core 30 having a first tuned coil 31 of conductive material, and a second coil 32 of conductive material having a greater number of turns than the first coil. The first coil 31 is tuned to resonate at the desired frequency, and the second coil 32 has a number of turns selected to maximize the sensitivity of the radio receiver 10. Apparently the remarkably improved sensitivity of the present invention is due to the fact that a single coil cannot provide both a high Q resonance condition for the antenna 11 and at the same time have a sufficient number of turns to provide a relatively high signal level to the RF amplifier 12. This is especially true when the RF amplifier 12 preferably includes a gallium arsenide field-effect transistor 33 which has a very high input impedance.

As shown in the drawing, the GAS-FET 33 is a dual-gate MOS-FET used in a common drain cascode configuration. In this configuration, the second coil 32 is connected via an input line 34 to the first gate of the GAS-FET, and the second gate of the GAS-FET is held at signal ground by a shunt capacitor 35. Therefore, the second gate isolates the first gate from the Miller effect of the amplified output signal appearing across a primary winding 36 of the coupling transformer 18. The AC circuit in the RF amplifier is completed by a by-pass capacitor 37 returning the output signal to ground.

The GAS-FET 33 is preferably a Nippon Electric Corporation Part No. NEC 41137, which has a noise figure of less than one dB at 100 MHz and a 1.5 mA drain current. The drain current is set at approximately this value by a biasing circuit including a source resistor 38 shunted by an RF bypass capacitor 39, and a resistor 40 connecting the second gate to the source of the GAS-FET 33. The preferred values for the components include 1,000 pF for the capacitor 35, 0.01 µF for the capacitor 37, 330 ohms for the resistor 38, 1000 pF for the capacitor 39, and 100K ohms for the resistor 40.

At relatively low drain currents and power supply voltages, a GAS-FET is preferable due to the low noise figure of the GAS-FET under these circumstances. When higher power supply voltages (e.g., greater than 8 v.) and increased drain current are available, it may become more economical to use a silicon MOS-FET in the RF amplifier 12. A preferred silicon MOS-FET is part No. BF960.

So that the ferrite-core antenna 11 would fit into a compact enclosure 41 shown in phantom lines, the dimensions of the core 30 were selected to be 7 centimeters in length, and 1.5 centimeters by 1 centimeter in width. In the drawing, the ferrite-core 30 and the components mounted thereon are drawn to scale. The ferrite material is preferably type 14C from Stackpole Corporation. As shown in the drawing, the elongated nature of the ferrite-core 30 causes the magnetic field B of incident electromagnetic radiation to be concentrated about the axis 42 of the core.

Preferably the first coil 31 is made of a band of conductive metal foil and preferably has a width of 1.5 centimeters. The coils 31 and 32, for example, are made of three mil thick copper foil which is supplied in the form of adhesive backed metal tape. The second coil 32 preferably includes three turns of copper foil in the form of a narrow strip having a width of 2 millimeters.

In order to provide a relatively low impedance capacitance for resonating with the inductance of the first coil 31 at the desired frequency, the two terminals of the first coil 31 are shunted by a number of capacitors in parallel. So that the shunt capacitance is varied in response to the automatic frequency control signal on the line 17, the capacitors include varactors 43. Each varactor has a respective series connected DC blocking capacitor 44. The varactors 43 are each part No. BB221, and the DC blocking capacitors 44 are 1,000 pF chip capacitors. The leads of the diodes are cut as short as possible for soldering to their respective chip capacitors and one of the terminals of the first coil 31. To reduce parasitic impedances, the varactors 43 and chip capacitors 44 are evenly spaced along the length of the coil 31. Moreover, to bias the varactors 43 with the automatic frequency control signal, the varactors are connected to the automatic frequency control line 17 via resistors 45. The resistors 45 each have a value of, for example, 100K ohms. A resistor 46 provides a ground return and has a value, for example, of 10K ohms.

So that the ferrite-core antenna 11 is tuned to the same frequency as the RF amplifier 12 for the same automatic frequency control voltage, the first coil 31 could be shunted by a small trimmer capacitor. However, it has been found that the effective capacitance resonating with the first coil 31 can be varied by varying the distance between the first coil 31 and the second coil 32. The variation of this distance, as well as the setting of the local oscillator trimmer capacitor 26, need only be done once after assembly of the radio receiver 10.

The capacitance provided by the varactors 43 and the blocking capacitors 44 for tuning the first coil 31 is about 100 picofarads. This represents a reactance of about 16 ohms at 100 MHz. The GAS-FET 33, on the other hand, has an input capacitance of about 0.5 picofarads, representing a reactance of about 3,000 ohms at 100 MHz. The ferrite core 30 has high permeability and at the same time has low loss (high Q) at the desired frequency. At 100 MHz the one-turn loop 31 with the ferrite material 14C has a Q of about 100. When the one-turn loop is tuned with the varactors 43 and capacitors 44, the current resonating in the one-turn loop 31 is increased relative to an untuned loop by a factor equal to the Q, or about 100 times. Therefore, electromagnetic radiation incident upon the ferrite core 30 produces an input signal on line 34 having a maximum voltage amplitude due to the resonance condition of the first coil 31 as well as the increased number of turns in the second coil 32.

Since the FET has very high input impedance, the voltage on the input line 34 is virtually open circuit voltage, and is therefore twice the voltage that would be obtained if the FET had a lower impedance matching the impedance of the coil 32.

For connecting a supplemental external antenna 47 to the radio receiver 10, it is preferable to wind a third coil 48 on an end portion of the ferrite core 30 opposite from the end portion upon which the second coil 32 is wound. When this is done, the supplemental antenna 47 has a relatively broad band response but the first coil 31 and the core 30 acts as a high Q filter to prevent signals of undesired frequency from passing from the external antenna 47 to the signal input 34 of the RF amplifier 12. As shown, the third coil 48 is preferably spaced about 1.3 centimeters from the first coil 31, and it is comprised of a three millimeter wide strip of three mil thick copper foil. The supplemental antenna 47 is, for example, an insulated, flexible wire about 35 centimeters in length. When the supplemental antenna is not connected, the third coil 48 is open circuit and has no influence on the operation of the "built-in" ferrite-core antenna 11.

In view of the above, there has been described a radio receiver for the VHF to UHF range using a compact ferrite-core antenna. By employing a pair of coils on the ferrite core, a signal of increased amplitude is provided for exciting a radio frequency amplifier having a relatively high input impedance. The magnitude of this input signal is increased both by the tuning of the first coil and by an increased number of turns in the second coil. In the VHF to UHF range, a high input impedance radio frequency amplifier is preferably provided by a GAS-FET. The first coil is preferably electronically tuned by a number of varactors in parallel which shunt the terminals of the first coil 31.

What is claimed is:

1. A tuned antenna for use in connection with a radio receiver for receiving an electromagnetic signal at a certain frequency, said antenna comprising an elongated ferromagnetic core having a longitudinal axis, a first coil comprising a predetermined number of turns of electrically conductive material disposed around said core, said first coil having a pair of terminals connected to a shunt capacitance, said shunt capacitance resonating with the inductance of said first coil at said frequency, and a second coil of electrically conductive material disposed around said core, wherein said second coil has a plurality of turns in excess of the number of turns of said first coil for connection to an input to said radio receiver.

2. The antenna as claimed in claim 1, wherein said ferromagnetic core is comprised of ferrite.

3. The antenna as claimed in claim 1, wherein said first coil is centrally located along said axis, and said second coil is offset by a certain distance along said axis from said first coil.

4. The antenna as claimed in claim 1, wherein said first coil has only a single turn of electrically conductive material around said core.

5. The antenna as claimed in claim 4, wherein said single turn of electrically conductive material consists of a band of conductive metal foil.

6. The antenna as claimed in claim 5, wherein said shunt capacitance is provided by a plurality of capacitors connected in parallel across end portions of said band of conductive metal foil.

7. The antenna as claimed in claim 6, wherein each of said capacitors includes a varactor diode for electronically tuning said antenna.

8. A radio receiver including an antenna for receiving an electromagnetic signal at a certain frequency, and an input stage having a field-effect transistor, wherein said antenna converts said electromagnetic signal to a corresponding electrical signal applied to a relatively high impedance gate terminal of said field-effect transistor, said antenna has an elongated ferrite core having a longitudinal axis and a first coil comprising a predetermined number of turns of electrically conductive material disposed around said core, said first coil; has a pair of terminals connected to a shunt capacitance, said shunt capacitance resonates with the inductance of said first coil at said frequency, said antenna has a second coil of electrically conductive material disposed around said core, and wherein said second coil has a plurality of turns in excess of the number of turns of said first coil, and said second coil is connected to said gate terminal of said field-effect transistor.

9. The radio receiver as claimed in claim 8, wherein said first coil is centrally located along said axis, and said second coil is offset along said axis by a certain distance from said first coil.

10. The radio receiver as claimed in claim 8, wherein said field-effect transistor is a gallium arsenide MOSFET transistor.

11. The radio receiver as claimed in claim 8, wherein said first coil has only a single turn of electrically conductive material around said core.

12. The radio receiver as claimed in claim 11, wherein said single turn of electrically conductive material consists of a band of conductive metal foil.

13. The radio receiver as claimed in claim 12, wherein said shunt capacitance is provided by a plurality of capacitors connected in parallel across end portions of said band of conductive metal foil.

14. The radio receiver as claimed in claim 13, wherein each of said capacitors includes a varactor diode for electronically tuning said antenna.

15. The radio receiver as claimed in claim 8, further comprising an enclosure, and wherein said antenna including said ferrite core is enclosed within said enclosure and has a third coil around said core, and said third coil has a terminal for connection to a supplemental antenna external to said enclosure.

16. A radio receiver comprising an enclosure, a compact antenna within said enclosure for receiving an electromagnetic signal at a certain frequency in the VHF to UHF range, and an input stage including a gallium arsenide field-effect transistor, wherein said antenna has an elongated ferrite core having a longitudinal axis, said antenna has a first coil including a single turn of conductive metal foil in the form of a band disposed at a central location about said core, said first coil has a pair of terminals connected to a shunt capacitance which resonates with the inductance of said first coil at said frequency, said antenna has a second coil of electrically conductive material disposed around said core, and wherein said second coil has a plurality of turns and is connected to a gate terminal of said field-effect transistor.

17. The radio receiver as claimed in claim 16, wherein said second coil is offset along said axis by a certain distance from said first coil, said shunt capacitance is provided by a plurality of capacitors. connected in parallel across end portions of said band of conductive metal foil, and said capacitors include varactor diodes for electronically tuning said antenna.

18. The radio receiver as claimed in claim 17, wherein said distance is manually selectable so that said antenna is manually tunable after assembly of said radio receiver.

19. The radio receiver as claimed in claim 16, wherein said second coil is offset along said axis by a certain distance from said first coil, said antenna has a third coil offset in an opposite direction along said axis by a certain distance from said first coil, and said third coil has a terminal for connection to a supplemental antenna external to said enclosure.

20. The radio receiver as claimed in claim 16, wherein said frequency is in the FM broadcast band, said band of conductive metal foil has a width of about 1.5 centimeters, and said elongated core has a circumference of about 5 centimeters and a length of about 7 centimeters.

* * * * *